(12) United States Patent  (10) Patent No.: US 9,092,407 B2
Carney et al.                    (45) Date of Patent:    Jul. 28, 2015

(54) VIRTUAL INTERFACE ADJUSTMENT METHODS AND SYSTEMS

(71) Applicant: Verizon Patent and Licensing Inc., Arlington, VA (US)

(72) Inventors: Mark D. Carney, Sterling, VA (US); Dante J. Pacella, Charles Town, WV (US); Martin W. McKee, Herndon, VA (US); Jeffrey A. Jackson, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 151 days.

(21) Appl. No.: 14/015,771

(22) Filed: Aug. 30, 2013

(65)  Prior Publication Data

US 2015/0067490 A1  Mar. 5, 2015

(51) Int. Cl.
  *G06F 11/00*  (2006.01)
  *G06F 17/24*  (2006.01)
  *G06F 3/0488*  (2013.01)

(52) U.S. Cl.
  CPC ............ *G06F 17/24* (2013.01); *G06F 3/04886* (2013.01)

(58) Field of Classification Search
  CPC ............................. G06F 17/24; G06F 3/04886
  USPC .................................... 714/701, 48; 715/773
  See application file for complete search history.

(56)  References Cited

U.S. PATENT DOCUMENTS

| | | | |
|---|---|---|---|
| 6,608,549 B2 * | 8/2003 | Mynatt et al. | 340/5.8 |
| 2008/0155478 A1 * | 6/2008 | Stross | 715/849 |
| 2010/0302165 A1 * | 12/2010 | Li | 345/168 |
| 2011/0229126 A1 * | 9/2011 | Gerstel | 398/25 |
| 2012/0132746 A1 * | 5/2012 | Sizelove | 244/118.6 |
| 2013/0174079 A1 * | 7/2013 | Morley et al. | 715/773 |
| 2013/0246861 A1 * | 9/2013 | Colley et al. | 714/48 |

\* cited by examiner

*Primary Examiner* — David Ton

(57)  ABSTRACT

An exemplary method includes a virtual interface adjustment system detecting, based on user input data associated with user input received by way of a virtual interface of a user device, an erroneous input pattern that includes at least one unintentional input, determining, based on the erroneous input pattern, an adjustment procedure configured to adjust the virtual interface to avert future unintentional inputs that correspond to the at least one unintentional input of the erroneous input pattern, determining an adjustment procedure trigger for the adjustment procedure, activating the adjustment procedure trigger, detecting, after the activating, an occurrence of the adjustment procedure trigger, and executing, in response to the detecting of the occurrence of the adjustment procedure trigger, the adjustment procedure to avert the future unintentional inputs that correspond to the at least one unintentional input of the erroneous input pattern. Corresponding methods and systems are also described.

20 Claims, 13 Drawing Sheets

Erroneous Input Pattern
500

| | |
|---|---|
| Text Input: | mosyakr |
| Corrective Input: | mistake |
| Input Context: | Text-messaging application executing |
| | Physical attributes of user device associated with the input |
| Input Attributes: | Input touch locations |
| Virtual Interface Attributes: | Virtual button locations |

Fig. 5

Adjustment Procedure
600

Shift effective input areas of virtual buttons on the top row of the virtual keyboard by a certain distance to the right along the x-axis of the virtual interface

Fig. 6

Adjustment Procedure Trigger
700

Operational Attributes: text-messaging application executing

Physical attributes: attributes indicative of right-handed only handheld position in which orientation is slightly angled off of a portrait orientation

Fig. 7

VIRTUAL INTERFACE ADJUSTMENT METHODS AND SYSTEMS

BACKGROUND INFORMATION

Currently available computing technologies include a variety of user devices, such as mobile telephones, tablet computers, laptop computers, desktop computers, and more. Many such devices include a touch screen capable of displaying a virtual interface (e.g., a virtual keyboard) and receiving touch input from a user by way of the virtual interface. The user may input commands and information into the user device by touching locations on the touch screen that correspond to buttons or other features of the virtual interface.

However, the use of virtual interfaces can often include one or more of a variety of inadequacies. For instance, finger size, dexterity, typing habits, usage of a user device, and other factors can vary greatly between users, yet the sizes and dimensions of virtual keyboards and other virtual interface components are typically the same for each user device. So, for example, while the size, positioning, and spacing of the virtual buttons of a particular virtual keyboard might be amenable to one user, the same virtual keyboard configuration might be awkward, tedious, and/or error prone to another user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 5 illustrates an example of an erroneous input pattern according to principles described herein.

FIG. 6 illustrates an example of an adjustment procedure according to principles described herein.

FIG. 7 illustrates an example of an adjustment procedure trigger according to principles described herein.

DETAILED DESCRIPTION OF PREFERRED EMBODIMENTS

Exemplary virtual interface adjustment methods and systems are described herein. The exemplary methods and systems described herein may dynamically adjust a virtual interface to tailor the virtual interface to a user and/or a user device. The tailoring may increase the convenience, accuracy, efficiency, and/or reliability with which a user is able to provide input to the virtual interface. For example, an adjustment to a virtual interface may avert unintentional inputs by a user, which may reduce the quantity of and/or need for manual and/or automatic corrections of unintentional inputs. Exemplary virtual interface adjustment methods, systems, and devices will now be described in reference to the drawings.

Figure 1:
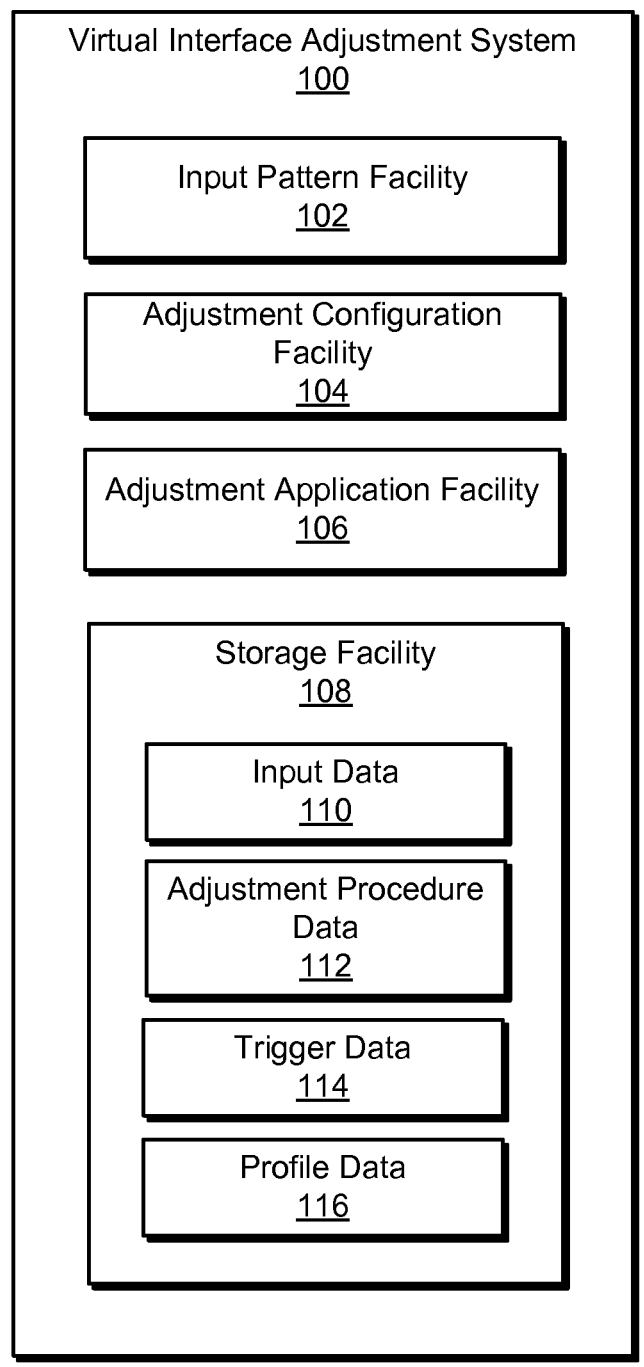
FIG. 1 illustrates an exemplary virtual interface adjustment system according to principles described herein.

FIG. 1 illustrates an exemplary virtual interface adjustment system 100 ("system 100"). System 100 may include, without limitation, an input pattern facility 102, an adjustment configuration facility 104, an adjustment application facility 106, and a storage facility 108 selectively and communicatively coupled to one another. Any suitable communication technologies may be employed to facilitate communications between facilities 102-108.

While facilities 102-108 are shown to be separate facilities in FIG. 1, any of facilities 102-108 may be combined into fewer facilities, such as into a single facility, or divided into more facilities as may serve a particular implementation. Facilities 102-108 of system 100 may include or be otherwise implemented by one or more computing devices. In such implementations, system 100 may be referred to as a computer-implemented system 100. Each of these facilities will now be described in more detail.

Storage facility 108 may be configured to store data generated and/or used by input pattern facility 102, adjustment configuration facility 104, and/or adjustment application facility 106. For example, storage facility 108 may store input data 110 associated with (e.g., representative of) input provided by one or more users by way of one or more virtual interfaces. Input data 110 may additionally or alternatively represent one or more detected input patterns associated with the input. Examples of input patterns are described herein.

Storage facility 108 may also store adjustment procedure data 112 representative of one or more adjustment procedures configured to be executed to adjust one or more virtual interfaces, trigger data 114 representative of one or more adjustment procedure triggers configured to trigger execution and/or termination of the one or more adjustment procedures, and/or profile data 116 representative of one or more virtual interface adjustment profiles. Examples of adjustment procedures, adjustment procedure triggers, and virtual interface adjustment profiles are described herein. Storage facility 108 may store additional or alternative data as may serve a particular implementation.

Input pattern facility 102 may be configured to receive user input data associated with (e.g., representative of) user input received by way of a virtual interface of a user device. Input pattern facility 102 may receive the user input data from any suitable source, including from the virtual interface, the user device, and/or one or more components of the user device.

Figure 2:
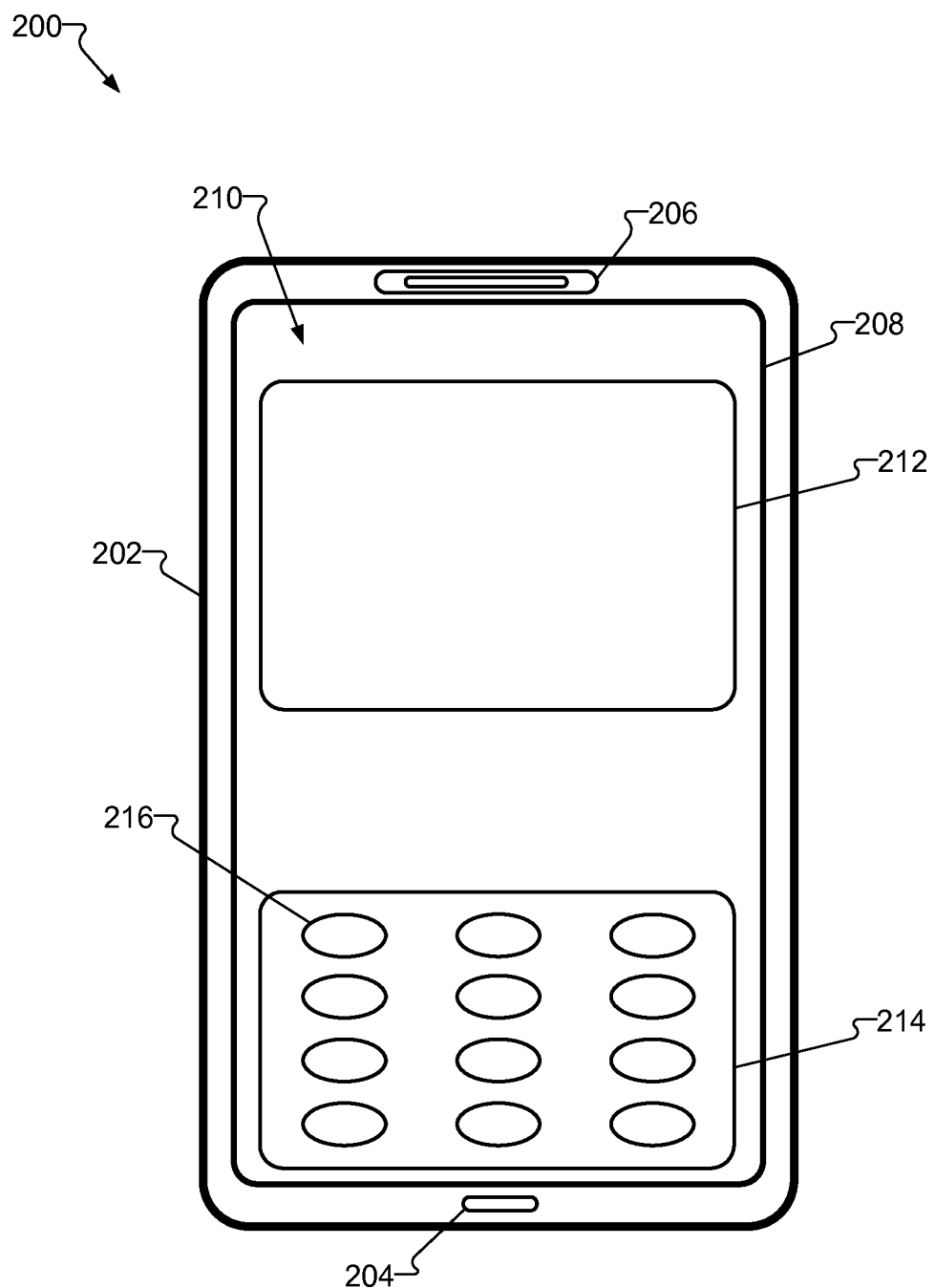
FIG. 2 illustrates an exemplary user device that may implement one or more components of the system of FIG. 1 according to principles described herein.

To illustrate, a user may provide user input by way of a virtual interface of a user device. FIG. 2 illustrates an exemplary user device 200 that may implement one or more components of system 100. User device 200 may include any suitable user computing device, such as a mobile device (e.g., a portable handheld computing device), a mobile telephone, a tablet computer, a laptop computer, a personal digital assistant ("FDA") device, or other suitable device configured to perform one or more of the operations described herein.

As shown, user device 200 may include a housing structure 202, a microphone 204, a speaker 206, and a display 208. Display 208 may include a touch screen (i.e., a touch-sensitive display screen) configured to display visual content (e.g., text, graphics, images, video, a graphical user interface ("GUI"), and/or other visual content) and receive touch input.

Display 208 may be implemented using any suitable technologies, including, without limitation, any of a liquid crystal display ("LCD"), a plasma display panel ("PDF"), a field emission display ("FED"), a thin film transistor ("TFT") display, and one or more touch screen (or touch-sensitive) technologies. The touch screen technologies may include any suitable touch sensing technologies, including, without limitation, capacitive sensing, surface acoustic wave sensing, resistive sensing, optical sensing, pressure sensing, infrared sensing, and gesture sensing technologies.

User device 200 may provide a virtual interface 210, components of which may be displayed on display 208. For example, virtual interface 210 may include a GUI having an input display area 212 and an input area 214, which may be visually depicted on display 208 as shown in FIG. 2. Input area 214 may include one or more user selectable virtual input objects (e.g., virtual buttons), such as virtual input object 216. Each virtual input object may include a visual display object displayed to visually represent the virtual input object on display 208 and/or an effective touch object that defines a specific area of a touch screen of display 208 to be touched by a user to select the visual display object. The visual display object and the effective touch object of a virtual display object may correspond to the same area (i.e., have aligning positions) or different areas (i.e., have non-aligning positions) of a touch screen of display 208.

Each virtual input object may be mapped to one or more input operations, such as input of a letter, a number, a symbol, a function, a mathematical operation, etc. Accordingly, a user may provide input by way of virtual interface 210 by selecting (e.g., touching) a virtual input object to trigger performance of an input operation, such as an input of a letter, number, or symbol that is mapped to the virtual input object. In certain examples, input area 214 may include a virtual keypad, such as a virtual numerical keypad, a virtual telephone interface, a virtual keyboard (e.g., a full, partial, and/or modified virtual QWERTY keyboard), or any other virtual keypad.

Input display area 212 may be configured to display graphical representations of user input (e.g., letters, numbers, symbols, etc.) received from the user, including user input received from the user by way of user selections of virtual input objects included in a virtual keypad in input area 214. Accordingly, a user of user device 200 may provide user input by way of virtual interface 210, such as by providing touch input on display 208 while virtual interface 210 is provided on display 208 by user device 200. For example, the user may touch one or more buttons of a virtual keypad included in virtual interface 210 to trigger input operations associated with the buttons. For instance, the user may type on the virtual keypad to provide textual input to user device 200, and the textual input may be displayed in input display area 212.

User device 200 may be configured to generate user input data associated with user input received by way of virtual interface 210. The user input data, which may be stored as input data 110 in storage facility 108, may include any data representative of user input provided by way of virtual interface 210. For example, user input data may represent textual input provided by a user typing on a virtual keypad of virtual interface 210. User input may refer to a single instance of user input or a sequence or other set of multiple instances of user input (e.g., a sequence of textual input typed by the user on a virtual keypad).

The user input data may also include data representative of a context in which the user input is provided by the user. For example, the user input data may include data representing one or more attributes of user device 200 associated with the providing of the user input to virtual interface 210. Examples of such attributes may include operational attributes of user device 200, such as processes and/or applications being executed by user device 200 when the user input is provided by the user. Other examples of such attributes may include physical attributes of user device 200 when the user input is provided by the user, such as an orientation of user device 200 relative to the user.

As used herein, an orientation of user device 200 relative to a user may indicate any physical attribute or set of physical attributes of user device 200 relative to the user. For example, the orientation of user device 200 may indicate how user device 200 is held by the user when the user input is provided by the user. As an example, user device 200 may be held in a portrait orientation, a landscape orientation, at an angle between a portrait orientation and a landscape orientation, or a combination of different orientations when the user input is provided by the user. As another example, user device 200 may be held by only a right hand of the user, only a left hand of the user, a combination of both hands of the user, or in a combination of different handheld configurations when the user input is provided by the user. The above-described physical attributes of user device 200 are illustrative only. Any other physical attributes of user device 200 (e.g., tilt angle, motion, ambient light, etc.) associated with user input provided by the user may be represented in the user input data.

The operational and/or physical attributes of user device 200 associated with user input may be determined by user device 200 in any suitable way and using any suitable technologies. For example, user device 200 may include one or more sensors configured to sense physical attributes of user device 200, and user device 200 may be configured to use data from the sensors to determine one or more physical attributes of user device 200 relative to the user. Examples of such sensors may include, without limitation, one or more motion sensors (e.g., accelerometers), gyroscopes, object proximity sensors, touch sensors, and ambient light sensors.

The user input data may additionally or alternatively include data representative of one or more attributes of input and/or the providing of the input. For example, the user input data may include data representing locations on a touch screen (e.g., x-y coordinate locations on a touch screen) touched by a user to provide the input. User input data may include data representing locations of any type of input, including intentional, unintentional, and corrected input (e.g., manual and/or automatic corrections of user input).

Input pattern facility 102 may be configured to utilize user input data to detect an input pattern represented by the user input data. An input pattern may include any detectable set of attributes and/or regularity associated with user input provided by way of virtual interface 210. The regularity may include a repetition of, or repeatable, user input, sequences of user input, attributes of user input, attributes of the providing of the user input, and/or the context within which user input is provided. As an example, a detectable input pattern may include a user holding user device 200 in a particular orientation when using a virtual keypad to type textual input into a particular application executing on user device 200.

Input pattern facility 102 may be configured to detect, based on user input data, an erroneous input pattern. An erroneous input pattern may be an input pattern that includes at least one unintentional input. As used herein, an intentional user input refers to an input intentionally provided by a user and an unintentional input refers to input unintentionally provided by a user. To illustrate an example of an intentional input, a user may want to input a particular letter and may touch a virtual input object mapped to the letter in order to select the letter as input. To illustrate an example of an unintentional input, a user may want to input a particular letter but may unintentionally touch a virtual input object mapped to another letter instead of the virtual input object mapped to the intended letter.

Input pattern facility 102 may be configured to detect unintentional user input. For example, input pattern facility 102 may detect a correction of user input and infer from the correction of the user input that the user input was unintentional. The correction may include one or more auto-corrections of user input by user device 200 (e.g., using any suitable auto-correction technologies such as technologies configured to detect and auto-correct mistyped words) and/or one or more manual corrections of user input (e.g., such as a user inputting a letter, inputting a backspace operation to delete the letter, and inputting another letter in place of the deleted letter).

By detecting unintentional user input, input pattern facility 102 may detect, based on user input data, an erroneous input pattern that includes the unintentional user input. Such an erroneous input pattern may include intentional input in addition to the unintentional input. The intentional input may include manual input intentionally provided by a user (e.g., as initial input or corrected input) and/or input provided by auto-correction. For example, the intentional input may include a correction of the unintentional input (e.g., a manual correction provided by the user and/or an automatic correction performed by the user device 200).

An erroneous input pattern may further include context within which user input is provided by way of virtual interface 210. For example, the erroneous input pattern may include one or more attributes of user device 200 at a time the user input is received by way of virtual interface 210. For instance, an erroneous input pattern may include a sequence of intentional and unintentional input provided by a user to virtual interface 210, as well as an orientation and/or other attributes of user device 200 when the user input is provided to virtual interface 210.

An erroneous input pattern may further include one or more attributes of the input and/or the providing of the input included in the input pattern. For example, the erroneous input pattern may include locations on a touch screen of input included in the erroneous input pattern.

To illustrate one example, a detectable erroneous input pattern may include a user holding user device 200 in a particular orientation when using a virtual keypad to type textual input into a particular application executing on user device 200 and in which the textual input includes at least one unintentional input. User input data representative of the detectable erroneous input pattern may specify information associated with the unintentional input, such as a correction applied to correct the unintentional input, a location on the touch screen that was touched by the user to provide the unintentional input, the orientation of user device 200 relative to the user when user input is provided, intentional input and/or attributes of intentional input included in the erroneous input pattern (e.g., for intentional input provided proximate in time to the providing of the unintentional input), attributes of the user device 200 associated with the erroneous input pattern, attributes of input included in the erroneous input pattern, etc.

Input pattern facility 102 may be configured to detect an erroneous input pattern in any suitable way. As an example, input pattern facility 102 may process user input data to detect unintentional input (e.g., unintentional input occurring at or above a predefined frequency threshold). In response to a detection of unintentional input, input pattern facility 102 may further process user input data to detect an erroneous input pattern that includes the unintentional input. In certain examples, input pattern facility 102 may generate, from the user input data, a set of data representative of the erroneous input pattern for use by adjustment configuration facility 104 to determine an adjustment procedure that may be applied to the virtual interface 210 to avert future unintentional inputs that correspond to (e.g., are the same as or similar to) the unintentional input and/or the erroneous input pattern.

Adjustment configuration facility 104 may be configured to determine, based on an erroneous input pattern, an adjustment procedure configured to adjust a virtual interface to avert future unintentional inputs that correspond to at least one unintentional input of an erroneous input pattern (i.e., to avert unintentional inputs that are the same as and/or similar to at least one unintentional input of the erroneous input pattern). The adjustment procedure may include any set of one or more operations that may be applied to a virtual interface to modify one or more elements of the virtual interface and/or to modify one or more attributes of input received by way of the virtual interface.

As an example, the adjustment procedure may include one or more operations configured to move touch screen locations of virtual input objects of a virtual interface, such as by moving a visual display object and/or an effective touch object of a virtual input object from an original location to a different location on the touch screen. By moving a location of an effective touch object, the effective input area of the corresponding virtual input object on a touch screen is changed. For example, the effective input area of a virtual input object may be shifted a particular direction and/or distance on the surface of the touch screen (e.g., in a direction along an x-axis of the virtual interface (an "x-axis shift"), a direction along a y-axis of the virtual interface (a "y-axis shift"), or another direction that includes a combination of an x-axis shift and a y-axis shift). Such a shift may be configured to avert future unintentional inputs by a user.

To illustrate one example, within a particular context, a user may have a tendency to provide unintentional input by touching locations on a touch screen that are slightly offset from locations that the user intends to touch. For instance, the user may have a tendency to touch locations too far to the right of intended virtual buttons of a virtual keypad when using the user device 200 in a particular context (e.g., when holding the user device 200 in a particular orientation relative to the user). In such an example, adjustment configuration facility 104 may be configured to determine an adjustment procedure that is configured to be applied to the virtual interface to shift the effective input areas of one or more of the virtual buttons of the virtual keypad to the right such that when the user, according to his or her tendency, provides input by touching too far to the right of the virtual buttons that the user intends to touch, the user will actually touch the shifted effective input areas of the intended virtual buttons in the adjusted virtual interface. In this manner, an application of the adjustment procedure to the virtual interface averts unintentional input that would have been provided by the user if the adjustment procedure were not applied to adjust the virtual interface.

Figure 3:
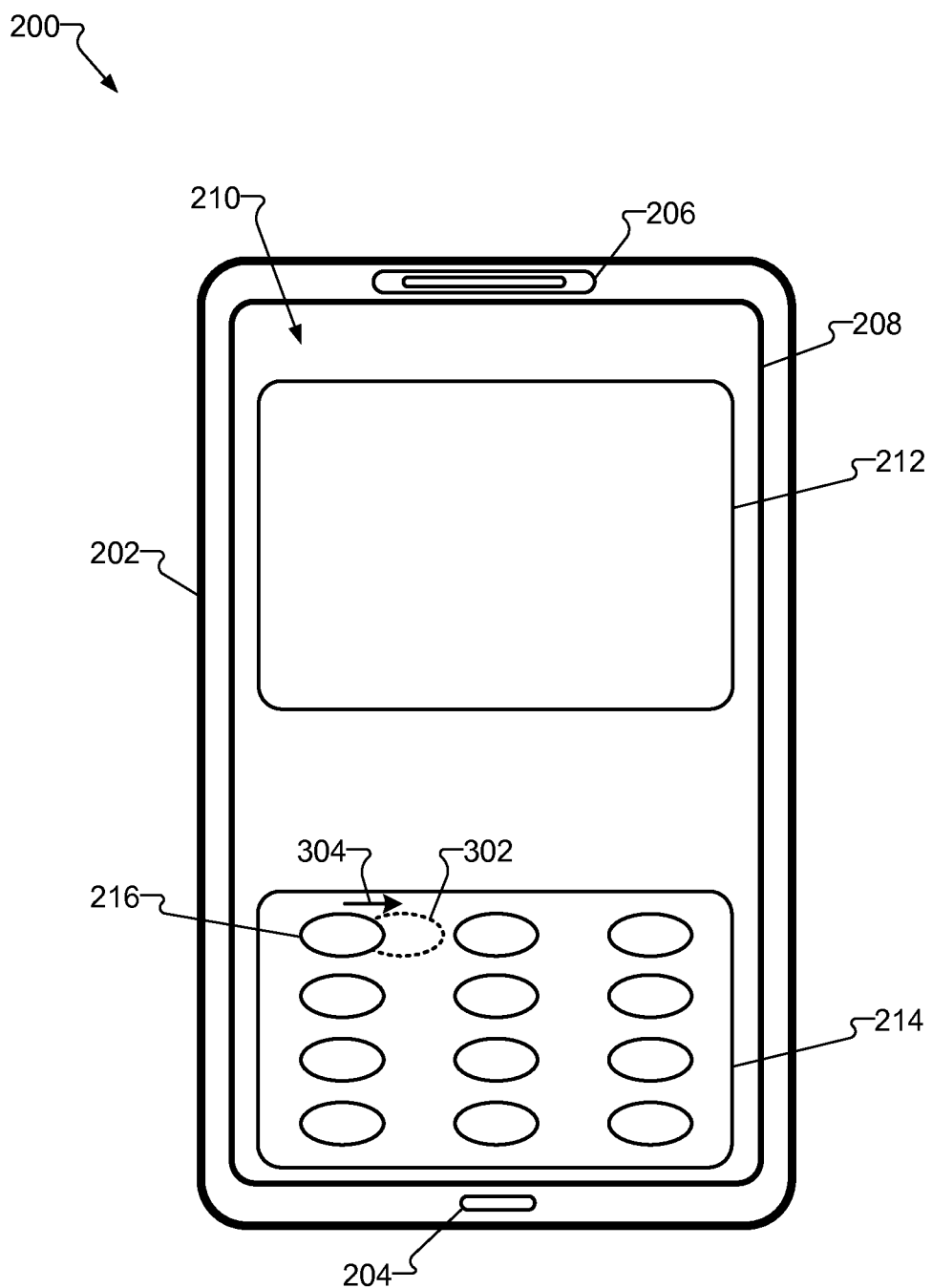
FIG. 3 illustrates an exemplary adjustment of a virtual interface provided by the user device of FIG. 2 according to principles described herein.

FIG. 3 illustrates an example of virtual interface 210 after an adjustment procedure has been applied to adjust the virtual interface 210. In this example, the adjustment includes a shifting of an effective input area 302 of virtual input object 216 to the right along an x-axis of the virtual interface a certain distance. The shifting of the effective input area 302 from an original touch screen location (e.g., a location that aligns with the virtual display object of the virtual input object 216) to an adjusted touch screen location is represented by shift arrow 304 in FIG. 3. The dashed lines of effective input area 302 represent that the effective input area 302 is not visibly indicated in virtual interface 210.

As another example, an adjustment procedure may include one or more operations configured to move locations of input received by way of a virtual interface, such as by moving a location of an input touch on the touch screen from an original location to a different location on the touch screen. For example, the touch screen coordinates of a touch input may be shifted a particular direction and/or distance on the surface of the touch screen (e.g., with an "x-axis shift," a "y-axis shift," or another directional shift that includes a combination of an x-axis shift and a y-axis shift). Such a shift may be configured to avert future unintentional inputs by a user.

For instance, for the example described above in which a user may have a tendency to touch locations too far to the right of intended virtual buttons of a virtual keypad when using the user device 200 in a particular context, adjustment configuration facility 104 may be configured to determine an adjustment procedure that is configured to be applied to the virtual interface to shift the locations of certain touch inputs to the left. With the adjustment procedure applied to the virtual interface, when the user provides input by touching too far to the right of the virtual buttons that the user intends to touch, according to his or her tendency, the locations of the touch inputs will be shifted to the left such that locations of the touch inputs will be within the effective input areas of the intended virtual buttons in the adjusted virtual interface. In this manner, an application of the adjustment procedure to the virtual interface averts unintentional input that would have been provided by the user if the adjustment procedure were not applied to adjust the virtual interface.

In certain examples, an adjustment procedure may include one or more operations configured to progressively adjust a virtual interface. For example, the magnitude of location shifting may be progressively increased until a frequency of input corrections fails to meet a predefined threshold of input corrections, at which point the progression may be stopped and the appropriate shift magnitude continued to be applied to adjust the virtual interface.

Adjustment configuration facility 104 may be configured to determine an adjustment procedure based on an erroneous input pattern in any suitable way. As an example, adjustment configuration facility 104 may be configured to analyze information associated with the erroneous input pattern to identify input patterns that tend to produce unintentional inputs and define one or more operations that may be performed to adjust a virtual interface to avert future instances of the unintentional inputs. For example, adjustment configuration facility 104 may compare touch screen locations of touch inputs for unintentional inputs and intentional inputs, including manual and/or automatic corrective inputs. By comparing these locations, adjustment configuration facility 104 may identify one or more input patterns associated with unintentional inputs relative to the inputs intended by a user. For instance, adjustment configuration facility 104 may determine, based on a comparison of touch screen locations of unintentional inputs and auto-corrected inputs, that for a particular area of the touch screen, the user has a tendency to touch the touch screen at locations that are too far to the right of intended virtual buttons when the user provides input in a particular context. Based on this determination, adjustment configuration facility 104 may define one or more shift operations that may be applied to virtual input touches and/or virtual input objects within the particular area of the touch screen to adjust the virtual interface to avert future unintentional inputs of this sort.

As another example, adjustment configuration facility 104 may be configured to determine an adjustment procedure based on an erroneous input pattern by obtaining the adjustment procedure for the erroneous input pattern from a repository of adjustment procedures. For instance, adjustment configuration facility 104 may send data representative of the erroneous input pattern to the repository for use in searching the repository to find a pre-existing matching adjustment procedure for the erroneous input pattern. The repository may be searched using information associated with the erroneous input pattern for an adjustment procedure that matches the erroneous input pattern. An adjustment procedure may be found and a determination made that the found adjustment procedure matches the erroneous data pattern. The repository may then send data representative of a matching adjustment procedure to adjustment configuration facility 104.

The repository may be maintained by adjustment configuration facility 104 and/or by a computing system separate and independent of system 100 and that is communicatively coupled to system 100. The repository may include adjustment procedures and related data received from adjustment configuration facility 104. The repository may be built up over time as erroneous input patterns are detected and corresponding adjustment procedures determined based on the erroneous input patterns. This may include adjustment configuration facility 104 publishing such data to the repository.

In certain examples, adjustment configuration facility 104 may be configured to determine an adjustment procedure based on an erroneous input pattern by first searching a repository of adjustment procedures for an adjustment procedure that matches the erroneous input pattern. If a match is not found, adjustment configuration facility 104 may analyze the erroneous input pattern and define an adjustment procedure for the erroneous input pattern.

In certain examples, the repository may include a community repository that contains adjustment procedures and related data received from a community of user devices and/or users of the user devices. The data in the community repository may be built up over time as the user devices publish erroneous input patterns, adjustment procedures, adjustment procedure triggers, and/or related data to the community repository. As described in more detail herein, the community repository may facilitate a leveraging of community experience to enhance virtual interface adjustments.

Adjustment configuration facility 104 may be further configured to determine an adjustment procedure trigger (or simply "trigger") for an adjustment procedure. For example, after determining an adjustment procedure based on an erroneous input pattern in any of the ways described herein, adjustment configuration facility 104 may determine a trigger for the adjustment procedure. An adjustment procedure trigger may include a defined set of one or more conditions to be satisfied to trigger an execution of an adjustment procedure to adjust a virtual interface and/or to trigger a termination of the execution of the adjustment procedure to terminate the adjustment to the virtual interface. The set of conditions may include, for example, specific attributes of the user device 200 (e.g., physical and/or operational attributes of the user device 200, such as an orientation of the user device 200 relative to a user and/or an application executing on the user device 200), specific attributes of user input, and/or any other conditions related to a context within which a user may provide input to a virtual interface.

Adjustment configuration facility 104 may be configured to determine an adjustment procedure trigger for an adjustment procedure in any suitable way. For example, adjustment configuration facility 104 may determine an adjustment procedure trigger based on an erroneous input pattern. For instance, for the example described above in which a user may have a tendency to touch locations too far to the right of intended virtual buttons of a virtual keypad when using the user device 200 in a particular context, adjustment configuration facility 104 may be configured to determine a trigger for the determined adjustment procedure by analyzing the erroneous input pattern to identify information indicative of the particular context and using the information to define a set of attributes descriptive of the context to be the trigger for the adjustment procedure.

To illustrate one example, adjustment configuration facility 104 may determine, from the erroneous input pattern, that there is a pattern of unintentional input being received by way of the virtual interface when a particular application is executing on the user device 200 (e.g., a text messaging application is executing on the user device 200) and/or the user device 200 has a particular orientation to the user of the user device 200 (e.g., the user is holding the user device 200 in the user's right hand only with the user device 200 angled slightly sideways off of a portrait orientation). Based on this determination, adjustment configuration facility 104 may define the trigger to include a set of conditions indicative of the user device 200 having matching attributes, i.e., when the same application is executing on the user device 200 and/or the user device 200 has approximately the same orientation to the user. The trigger may be configured to trigger execution of the adjustment procedure when the set of conditions is satisfied and to stop execution of the adjustment procedure when the set of conditions is no longer satisfied.

Adjustment configuration facility 104 may be configured to activate the adjustment procedure trigger such that a detection of an occurrence of the adjustment procedure trigger (e.g., an occurrence of an input context that matches a set of conditions defined by the adjustment procedure trigger) will trigger an execution of the adjustment procedure to adjust the virtual interface to avert unintentional inputs. This may be performed in any way suitable to make the adjustment procedure trigger active such that the adjustment procedure corresponding to the trigger will be executed in response to a detection of an occurrence of the adjustment procedure trigger. For example, one or more settings of the virtual interface and/or user device 200 may be set to activate the trigger. The activation may be performed by adjustment configuration facility 104 automatically in response to a determination of an adjustment procedure and corresponding trigger or in response to any other predefined event such as receipt of user input requesting the activation.

In certain examples, the activation of the trigger may include adjustment configuration facility 104 providing data representative of the trigger and corresponding adjustment procedure to adjustment application facility 106, which may be configured to apply the adjustment procedure to the virtual interface. For example, adjustment application facility 106 may receive the trigger and adjustment procedure and thereafter monitor for an occurrence of the trigger. In response to a detection of an occurrence of the trigger, adjustment application facility 106 may execute the adjustment procedure to adjust the virtual interface to avert unintentional inputs.

In certain examples, the activation of the trigger may include adjustment configuration facility 104 adding data representative of the trigger and corresponding adjustment procedure to a virtual interface adjustment profile associated with the user device 200 and/or a user of the user device 200. The virtual interface adjustment profile may include a collection of one or more triggers and corresponding adjustment procedures, and the profile may be configured for use by adjustment application facility 106 to adjust a virtual interface. Adjustment configuration facility 104 and/or adjustment application facility 106 may maintain the profile, which maintenance may include adding triggers and corresponding adjustment procedures to the profile over time.

Adjustment application facility 106 may adjust a virtual interface for any suitable duration. For example, adjustment application facility 106 may be configured to monitor for and detect when a set of conditions defined by the trigger are no longer satisfied (e.g., when the input context of the user device 200 has changed). In response to such a detection, adjustment application facility 106 may stop or reverse the adjustment to the virtual interface that was made by executing the adjustment procedure. The stop or reversal may be performed in any suitable way.

Accordingly, in certain examples, an adjustment procedure trigger may be configured to trigger an execution of the corresponding adjustment procedure in response to the user device 200 having a current orientation that matches the orientation of the user device 200 at the time the user input is received by way of the virtual interface. The trigger may be further configured to stop the execution of the adjustment procedure in response to a change in the current orientation of the user device 200 such that the current orientation no longer matches the orientation of the user device 200 at the time the user input is received by way of the virtual interface.

Adjustment configuration facility 104 may be configured to publish an erroneous input pattern, corresponding adjustment procedure, and/or corresponding trigger to a repository for future use by adjustment configuration facility 104 in determining adjustment procedures for other erroneous input patterns. The publishing may be performed in any suitable way, including storing data representative of this information to the repository. In certain examples, the repository may include a community repository, and adjustment configuration facility 104 may publish data representative of an erroneous input pattern, corresponding adjustment procedure, and/or corresponding trigger to the community repository, such as by transmitting data over a network (e.g., a wide area network) to the community repository.

Figure 4:
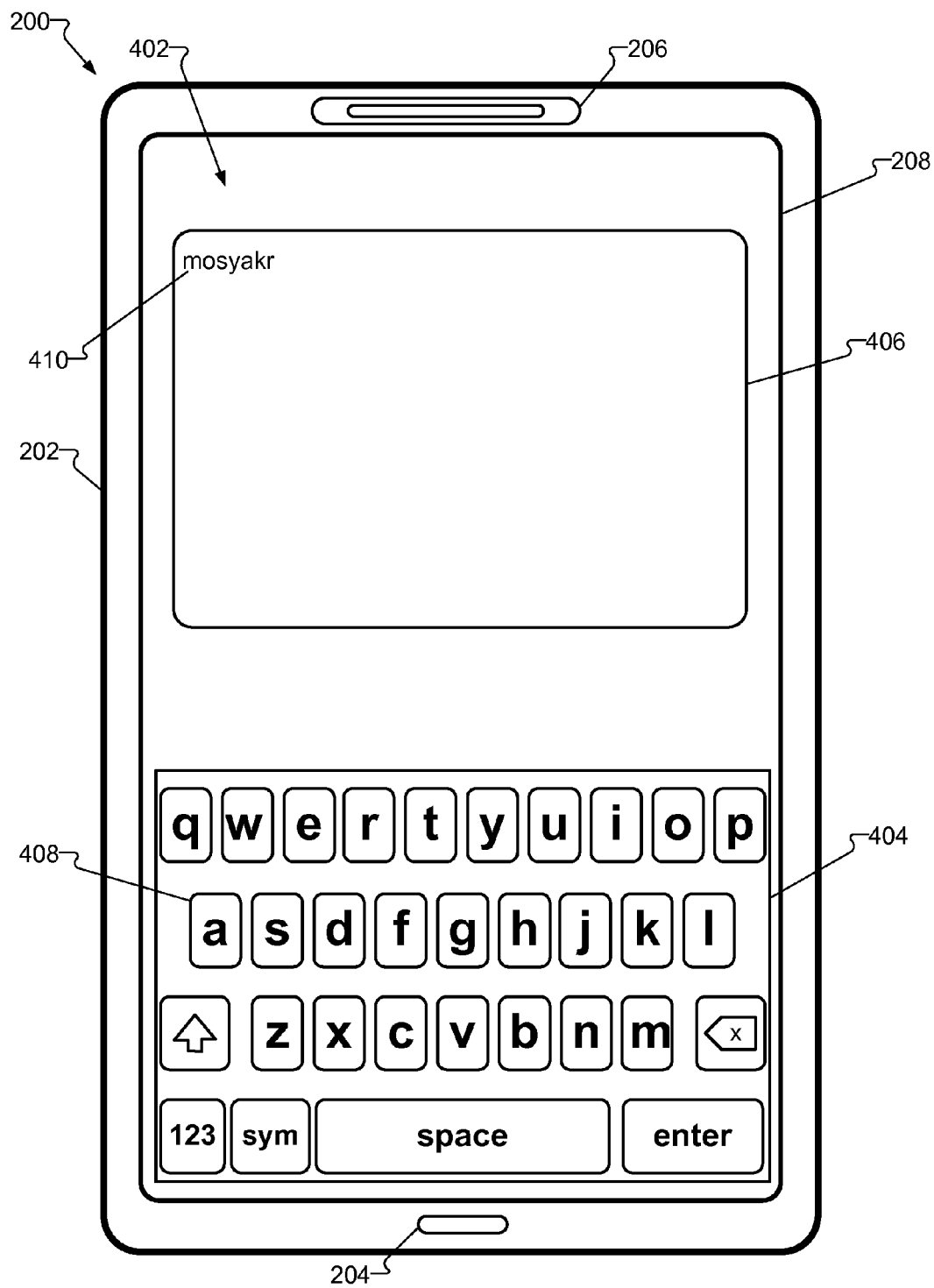
FIG. 4 illustrates an example of a virtual interface and input received by way of the virtual interface according to principles described herein.

To further illustrate, operations of facilities 102-106 will now be described in reference to a particular example of an erroneous input pattern, adjustment procedure, and adjustment procedure trigger. FIG. 4 illustrates the user device 200 providing a virtual interface 402 that includes an input area 404 and an input display area 406. As shown, input area 404 may include a virtual keyboard that includes virtual buttons mapped to particular inputs. For example, virtual button 408 is associated with an operation to provide the letter "A" as input.

With the user device 200 in a particular input context, a user of the user device 200 may provide input by touching one or more of the virtual buttons of the virtual keyboard. For example, while holding the user device 200 in a particular orientation relative to the user, such as in a right-handed only orientation in which the user device 200 has an orientation that is slightly angled off of a portrait orientation, the user may type on the virtual keyboard to provide textual input to a text messaging application executing on the user device 200. The user may intend to type the word "mistake." However, the user may unintentionally select the wrong virtual buttons for one or more of the letters in the word "mistake." The actual input provided by the user is displayed in the input display area 406. As shown, the user has unintentionally typed "mosyakr" instead of the word "mistake" as indicated by text 410 displayed in the input display area 406.

The unintentional input may be corrected manually by the user (e.g., by selecting a backspace virtual button followed by the intended virtual button) or automatically by the user device 200 analyzing the actual input, predicting that the user intended to type the word "mistake," and auto-correcting the actual input to the word "mistake."

Input pattern facility 102 may receive user input data associated with this input and detect, based on user input data, an erroneous input pattern associated with the input. FIG. 5 illustrates exemplary information that may be included in an erroneous input pattern 500 associated with this example. As shown, the erroneous input pattern 500 may include information specifying actual input provided by the user (e.g., the actual text input by the user), corrected input (e.g., auto-corrected or manually corrected input such as the corrected text), the context within which the input is provided (e.g., one or more attributes of the user device 200 associated with providing of the input such as operational attributes indicating a text-messaging application executing when the input is provided and/or physical attributes indicative of an orientation of the user device 200 to the user when the input is provided), attributes of the input provided by the user (e.g., touch screen locations of touch inputs provided by the user), and attributes of the virtual interface (e.g., touch screen locations of the virtual buttons of the virtual keyboard).

Adjustment configuration facility 104 may determine, based on the erroneous input pattern 500, an adjustment procedure configured to adjust the virtual interface 402 to avert future unintentional inputs that correspond to (e.g., that are the same and/or similar to) at least one unintentional input of the erroneous input pattern. For example, from the erroneous input pattern 500, adjustment configuration facility 104 may determine that unintentional inputs included in the text input correspond to virtual buttons positioned located immediately to the right of virtual buttons that correspond to the corrected input. For instance, adjustment configuration facility 104 may determine that the letter "o" in the text input is unintentional and that the actually intended input is the letter "i." Adjustment configuration facility 104 may further determine that the user touched a virtual button mapped to the letter "o" instead of touching a virtual button mapped to the letter "i," and that the "o" virtual button is positioned immediately to the right of the "i" button in the virtual keyboard. Adjustment configuration facility 104 may make similar determinations for the other unintentional inputs in the erroneous input pattern 500.

Adjustment configuration facility 104 may identify an input pattern associated with the erroneous input pattern 500. For example, adjustment configuration facility 104 may determine that each unintentional input is caused by a touch input too far to the right of an intended target, that each unintentional input occurred when the user attempted to touch a virtual button located on the top row of the virtual keyboard, and that each intentional input corresponds to virtual buttons not on the top row of the virtual keyboard. From this, adjustment configuration facility 104 may determine that the user may have a tendency to touch too far to the right of intended virtual buttons located on the top row of the virtual keyboard when the user types on the virtual keyboard within a specific input context.

Based on one or more of these determinations, adjustment configuration facility 104 may determine an adjustment procedure configured to adjust the virtual interface 402 to avert future unintentional inputs that correspond to at least one unintentional input of the erroneous input pattern. This may include determining an adjustment procedure that includes one or more operations configured to shift the effective input areas of the virtual buttons on the top row of the virtual keyboard to the right and/or to shift the locations of input touches on the top row of the virtual keyboard to the left to compensate for the detected tendency of the user. The adjustment procedure may be configured to adjust only the top row input of the virtual keyboard.

In other examples, the adjustment procedure may include operations configured to provide different adjustments to different areas of the virtual interface 402. For example, the touch input of a user may tend to be further off-target the further up on the virtual keyboard that the touch input is located. In such an example, the adjustment procedure may be configured to adjust the top row, the second row, and third row, and the fourth row of the virtual keyboard by different degrees of magnitude to compensate for the tendency of the user.

FIG. 6 illustrates an example of an adjustment procedure 600 that may be determined based on the erroneous input pattern 500. As shown, the adjustment procedure 600 may include an operation configured to shift the effective input areas of virtual buttons located on the top row of the virtual keyboard by a certain distance to the right along the x-axis of the virtual interface. The operation may be represented in the adjustment procedure 600 in any way suitable for the operation to be executed by the user device 200 to adjust the virtual interface 402. For example, the operation may be represented as executable computing code.

Adjustment configuration facility 104 may determine an adjustment procedure trigger for the adjustment procedure 600. For example, adjustment configuration facility 104 may determine, based on information associated with the erroneous input pattern 500, a context within which the input in the erroneous input pattern 500 was provided and define the trigger to include a set of conditions representative of the input context. Accordingly, when the input context occurs in the future, the set of conditions may be determined to be satisfied, and an execution of the adjustment procedure 600 triggered.

FIG. 7 illustrates an example of an adjustment procedure trigger 700 that may be determined for the adjustment procedure 600 based on the erroneous input pattern 500. As shown, the trigger 700 may include data representative of attributes of the user device 200 that are indicative of a particular input context, such as an input context in which a user of the user device 200 is holding the user device 200 in a particular orientation relative to the user, such as in a right-handed only orientation in which the user device 200 has an orientation that is slightly angled off of a portrait orientation. In other words, the trigger 700 may specify conditions to be satisfied to detect when the user device 200 is in an input context that is the same or similar to the input context associated with the erroneous input pattern 500.

Adjustment configuration facility 104 may activate the trigger 700 in any of the ways described herein. With the trigger 700 activated, adjustment application facility 106 may detect an occurrence of the trigger 700 (e.g., an occurrence of an input context that matches one or more attributes of the input context associated with the erroneous input pattern 500) and respond by triggering an execution of the adjustment procedure 600 to adjust the virtual interface 402 to avert unintentional inputs along the top row of the virtual keyboard.

Figure 8:
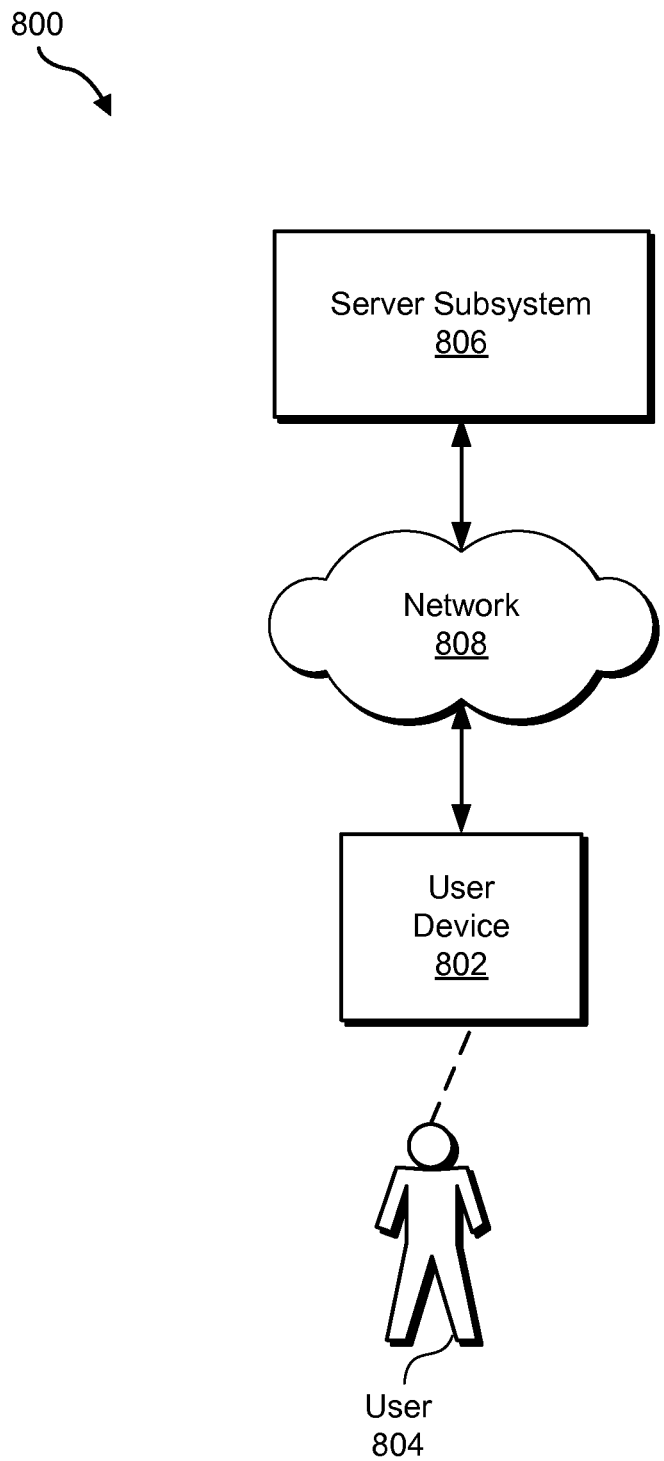
FIGS. 8-9 illustrate exemplary implementations of the system of FIG. 1 according to principles described herein.

FIG. 8 illustrates an exemplary implementation 800 in which system 100 is implemented. As shown, implementation 800 may include a user device 802 (e.g., any computing device that provides a virtual interface) associated with a user 804 of user device 802. User device 802 may be in communication with a server subsystem 806, which may include one or more computing devices (e.g., server devices remotely located from user device 802). In certain examples, server subsystem 806 may be associated with (e.g., operated by) a service provider providing one or more services to user 804, such as a telecommunications service provider providing one or more telecommunications services for access by user device 802.

User device 802 and server subsystem 806 may communicate using any communication platforms and technologies suitable for transporting data and/or communication signals, including known communication technologies, devices, media, and protocols supportive of remote communications. In certain embodiments, user device 802 and server subsystem 806 may communicate via a network 808. Network 808 may include one or more networks, such as one or more wireless networks (Wi-Fi networks), wireless communication networks, mobile telephone networks (e.g., cellular telephone networks), private networks, public networks, satellite networks, broadband networks, narrowband networks, the Internet, local area networks, wide area networks, and any other networks capable of carrying data and/or communications signals between user device 802 and server subsystem 806. Communications between user device 802 and server subsystem 806 may be transported using any one of the above-listed networks, or any combination or sub-combination of the above-listed networks. Alternatively, user device 802 and server subsystem 806 may communicate in another way such as by one or more direct connections between user device 802 and server subsystem 806.

In implementation 800, any elements (e.g., facilities 102-108) of system 100 may be implemented entirely by user device 802, entirely by server subsystem 806, or distributed across user device 802 and server subsystem 806.

Figure 9:
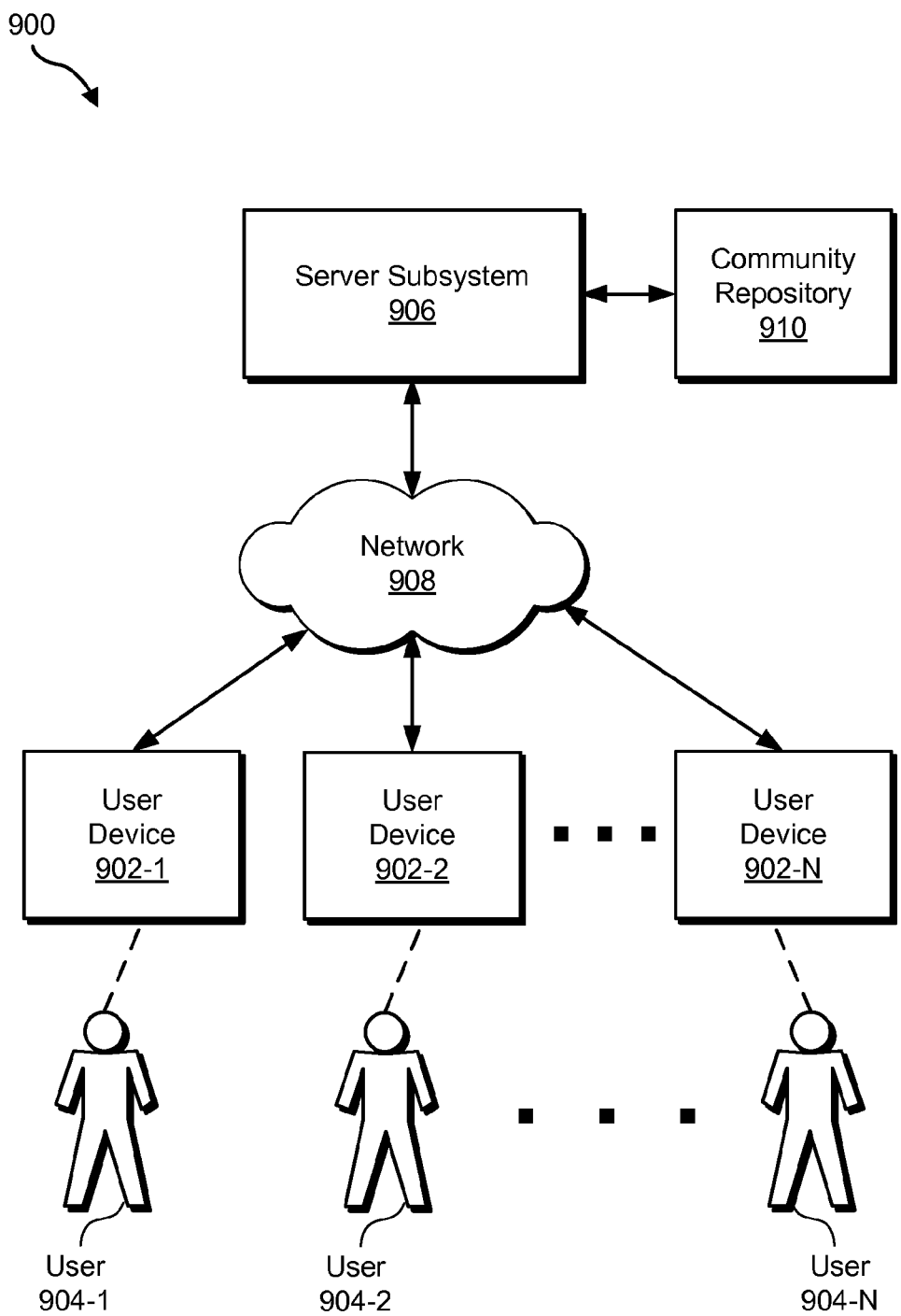

As mentioned, in certain examples, a community repository of adjustment procedures and corresponding adjustment procedure triggers may be maintained for a community of user devices (e.g., for user devices that access a service provided by a service provider). FIG. 9 illustrates another implementation 900 in which system 100 is implemented. As shown, implementation 900 may include user device 902 (e.g., user devices 902-1 through 902-N) each configured to provide a virtual interface and associated with a users 904 (e.g., users 904-1 through 904-2, respectively). User devices 902 may be in communication with a server subsystem 906, which may include one or more computing devices (e.g., server devices remotely located from user devices 902). In certain examples, server subsystem 906 may be associated with (e.g., operated by) a service provider providing one or more services to users 904, such as a telecommunications service provider providing one or more telecommunications services for access by user devices 902.

User device 902 and server subsystem 906 may communicate using any communication platforms and technologies suitable for transporting data and/or communication signals, including known communication technologies, devices, media, and protocols supportive of remote communications. In certain embodiments, user device 902 and server subsystem 906 may communicate via a network 908, which may include any suitable network or combination of networks, including any of those mentioned herein.

Server subsystem 906 may maintain a community repository 910, which may store data representative of adjustment procedures, corresponding adjustment procedure triggers, and/or related information. As mentioned, the data in community repository 910 may be built up over time. For example, system 100 may detect erroneous input patterns associated with virtual interfaces provided by user devices 902 and determine adjustment procedures and corresponding triggers for the erroneous input patterns, as described herein. System 100 may publish data representative of the adjustment procedures and corresponding triggers to community repository 910. The adjustment procedures and corresponding triggers represented in community repository 910 accumulate over time and represent a collection of erroneous input patterns, adjustment procedures, and adjustment procedure triggers to a community of user devices 902 and/or users 904.

System 100 may be configured to utilize community repository 910 to determine an adjustment procedure and corresponding trigger for an erroneous input pattern. For example, user 904-1 may provide input to a virtual interface provided by user device 902-2. Based on data representative of the user input received by way of the virtual interface, an erroneous input pattern may be detected. Data representative of at least a portion of the erroneous input pattern, and a request for a virtual interface adjustment procedure for the erroneous input patter, may be sent from the user device 902-1 to server subsystem 906 for use by server subsystem 906 to search community repository 910. Server subsystem 906 may search the community repository 910 based on at least part of the erroneous input pattern and find, based on the searching, an adjustment procedure and corresponding trigger within the community repository 910. The adjustment procedure and corresponding trigger may be found in any suitable way, such as by comparing information included in the erroneous input pattern to information in the adjustment procedure triggers stored in community repository 910 to find matching information. For instance, the erroneous input pattern may include data representing a particular orientation of user device 902-1 when the user input associated with the erroneous input pattern was received by way of the virtual interface provided by user device 902-1. This orientation of the user device may match an orientation of a user device specified by an adjustment procedure trigger included in community repository 910. Based on this match, the adjustment procedure trigger and the corresponding adjustment procedure may be found and designated as a match to the erroneous input pattern.

The adjustment procedure and corresponding trigger found within community repository 910 may be further determined to match the erroneous input pattern. For example, additional information included in the erroneous input pattern may be compared to additional information specified by the trigger and/or the adjustment procedure. If, based on such comparisons, information is determined to match to at least a predefined degree, the adjustment procedure and corresponding trigger may be determined to be a match to the erroneous input pattern.

Once a match is determined, data representative of the matching adjustment procedure and the corresponding trigger may be provided from server system 906 to user device 902-1. User device 902-1 may receive the adjustment procedure and corresponding trigger from server subsystem 906 and use the adjustment procedure and corresponding trigger in any of the ways described herein to avert future unintentional input to the virtual interface provided by user device 902-1.

In this or similar manner, adjustment procedures and corresponding triggers that have been previously determined by system 100 for a community of user devices 902 and/or users 904 may be leveraged to enhance current or future adjustments of virtual interfaces provided by the user devices 902 and/or other user devices. For example, system 100 may generate and maintain a virtual interface adjustment profile for user device 902-1. The adjustment profile for user device 902-1 may become robust and comprehensive over time based on many experiences of user 904-1 providing input to the virtual interface provided by user device 902-1.

Subsequently, user device 902-2 may be put into service and used by user 904-2. User 904-2 may provide input to a virtual interface provided by user device 902-2, and the user input may include an erroneous input pattern that is detected by system 100. System 100 may search the repository 910 and identify an adjustment procedure and corresponding trigger included in the adjustment profile associated with user device 902-1 as being a match to the erroneous input pattern associated with user device 902-2. For example, the search may identify that the trigger and the erroneous input pattern specify matching input contexts, such as the same or similar orientation of user device relative to its user.

Additionally or alternatively, the search may identify matches between other attributes of the erroneous input pattern and other attributes of the adjustment procedure. For example, the search may reveal that the erroneous input pattern specifies that touch inputs provided by user 902-2 are offset a particular direction and distance from intended targets, and that the adjustment procedure includes one or more operations configured to adjust a virtual interface in a direction and/or distance configured to compensate for the offset (e.g., the offset in the erroneous input pattern is 0.2 millimeters, and the shift distance in the adjustment procedure is also 2 millimeters). In this or a similar manner, similarities between community-based adjustment procedures and triggers and current erroneous input patterns may be used to determine an appropriate, existing adjustment procedure and corresponding trigger as a match to current erroneous input patterns.

Figure 10:
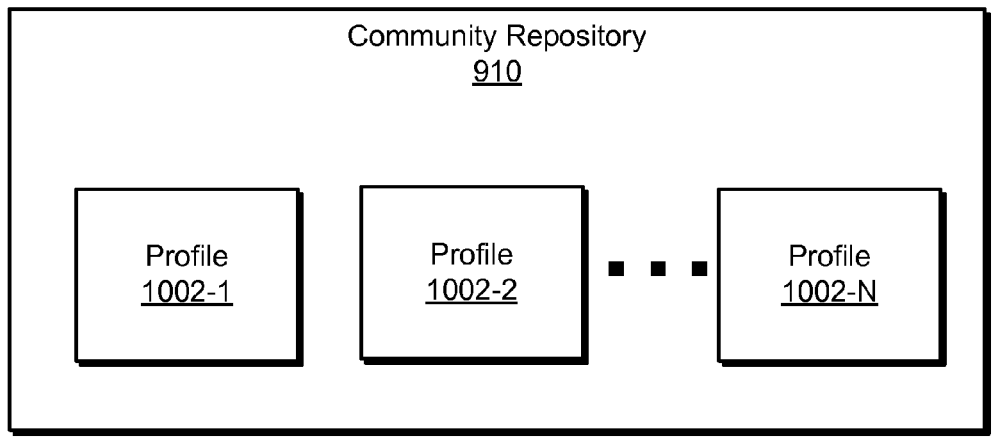
FIG. 10 illustrates an example of a community repository storing profiles according to principles described herein.

In certain examples, community repository 910 may store data representative of a profile for each user device 902 and/or user 904 included in the community. FIG. 10 illustrates exemplary profiles 1002 (e.g., profiles 1002-1 through 1002-N) respectively corresponding to user devices 902 and/or users 904. Each profile 1002 may include a set of one or more pairs of adjustment procedures and corresponding triggers associated with the respective user device 902 and/or user 904. In this regard, each profile 1002 may be a virtual interface adjustment profile.

In certain examples, each profile 1002 may include an adjustment profile and additional profile information, such as additional information about the respective user device 902 and/or user 904. For example, profile 1002-1 may include an adjustment profile for user device 902-1 and/or user 904-1 and additional information about user device 902-1 and/or user 904-1. In some examples, the additional information may include information that has been accessed in relation to the user's 904-1 participation in a service provided by a service provider associated with server subsystem 906. For example, user 904-1 may utilize user device 902-1 to access a telecommunications or other service provided by a service provider. In association with the use of the service, user 904-1 and/or user device 902-1 may provide information about the user 904-1 and/or user device 902-1 to server subsystem 906 and/or the service provider. This information may be stored in profile 1002-1 and used by server subsystem 906 to determine adjustment procedures, triggers, and/or adjustment profiles that match erroneous input patterns. This may enhance the effectiveness with which server subsystem 906 is able to successfully match the adjustment procedures, triggers, and/or adjustment profiles to erroneous input patterns.

To illustrate, user 904-1 may work in the medical field and may utilize user device 902-1 for this work. Profile 1002-1 may be generated and maintained for the user device 902-1 and/or user 904-1 and may include an adjustment profile built up by system 100 and other information, such as information indicating that user 904-1 works in the medical field and/or what type of work user 904-1 does in the medical field.

Subsequently, user device 902-2 may be put into service by user 904-2, who also works in the medical field. Profile 1002-2 may be generated and maintained for user device 902-2 and/or user 904-2. Early in the service, profile 1002-2 may include minimal or no adjustment profile information. However, profile 1002-2 may include information about user 904-2, such as information indicating that user 904-2 works in the medical field and/or what type of work the user 904-2 does in the medical field.

System 100 may detect an erroneous input pattern associated with user input received by way of a virtual interface provided by user device 902-2. System 100 may search community repository 910 for an adjustment procedure and corresponding trigger that match the erroneous input pattern. As part of the searching and determining whether a match is found, system 100 may compare profile information associated with user device 902-2 and/or user 904-2 to profile information associated with one or more other user devices 902 and/or users 904. For example, system 100 may perform such comparison and identify similarities between profile 1002-2 and profile 1002-1. In particular, system 100 may determine from comparison of the profiles 1002-2 and 1002-1 that users 904-2 and 904-1 both perform the same type of work in the medical field. This similarity may cause system 100 to further explore whether profile 1002-1 includes an adjustment procedure and/or corresponding trigger that matches the erroneous input pattern. If it does, system 100 may send data representative of the identified adjustment procedure and corresponding trigger from server subsystem 906 to user device 902-2. In certain examples, this may include sending an entire adjustment profile included in profile 1002-1 from server subsystem 906 to user device 902-2. Such profile sharing may allow user device 902-2 to leverage the adjustment profile built up for user device 902-1 such that a similar adjustment profile need not be built up from scratch, step-by-step over time for user device 902-2.

The above-described example of leveraging community-based profile information to enhance virtual interface adjustment is illustrative only. Community-based information maintained in community repository 910 may be leveraged in additional or alternative ways to enhance virtual interface adjustment.

In certain examples, system 100 may be configured to provide a training mode in which a user of a user device may provide input designed to train the user device on the input tendencies and/or patterns of the user. For example, adjustment configuration facility 104 of system 100 may be configured to prompt the user to use a virtual interface to type a predefined set of text. Based on the typed input provided by the user, one or more erroneous input patterns may be detected by input pattern facility 102. Based on the detected erroneous input patterns and/or the predefined set of text, adjustment configuration facility 104 may determine input tendencies of the user and/or one or more adjustment procedures and/or corresponding triggers for the erroneous input patterns.

Figure 11:
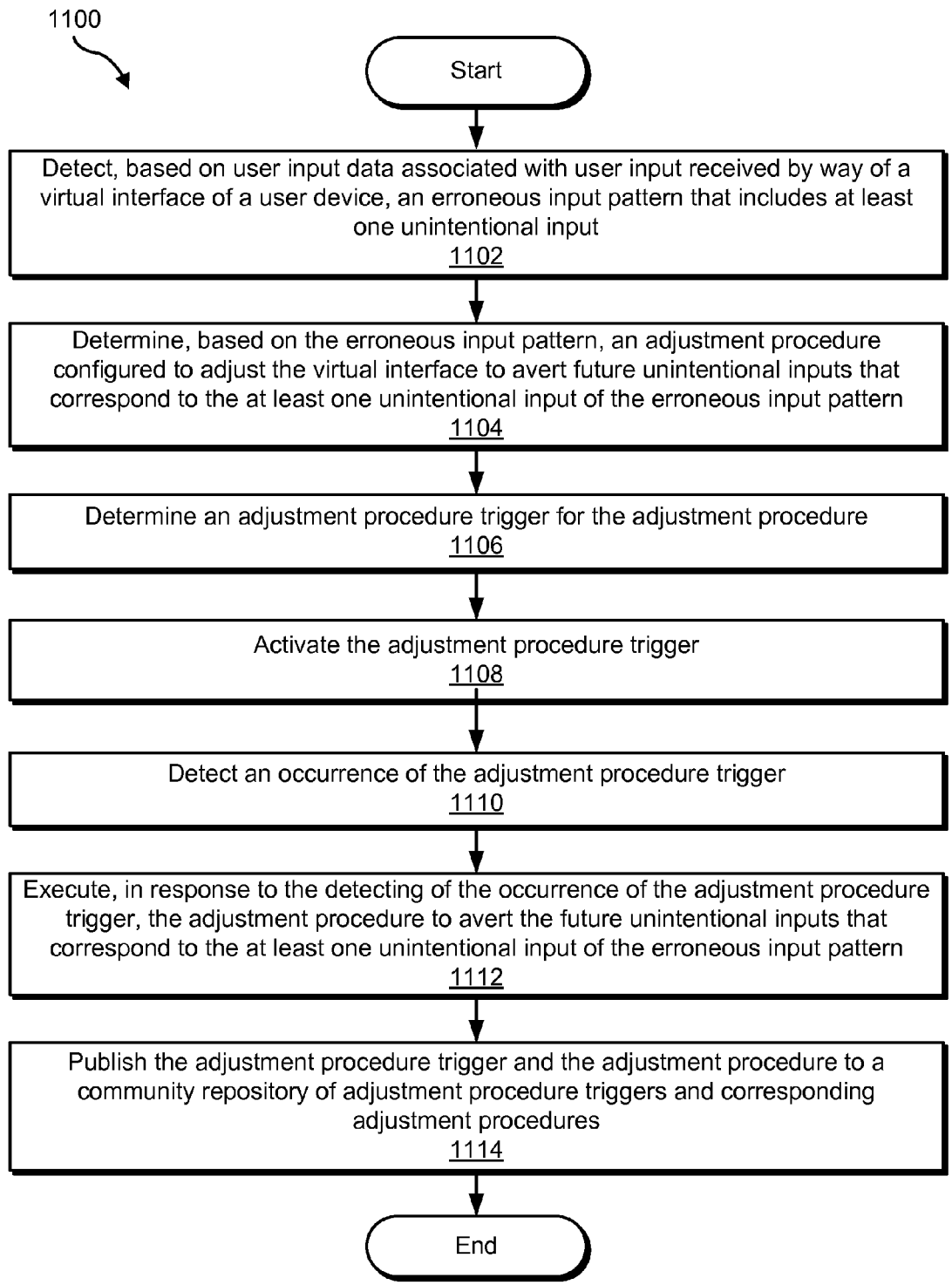
FIGS. 11-12 illustrate exemplary virtual interface adjustment methods according to principles described herein.
Figure 12:
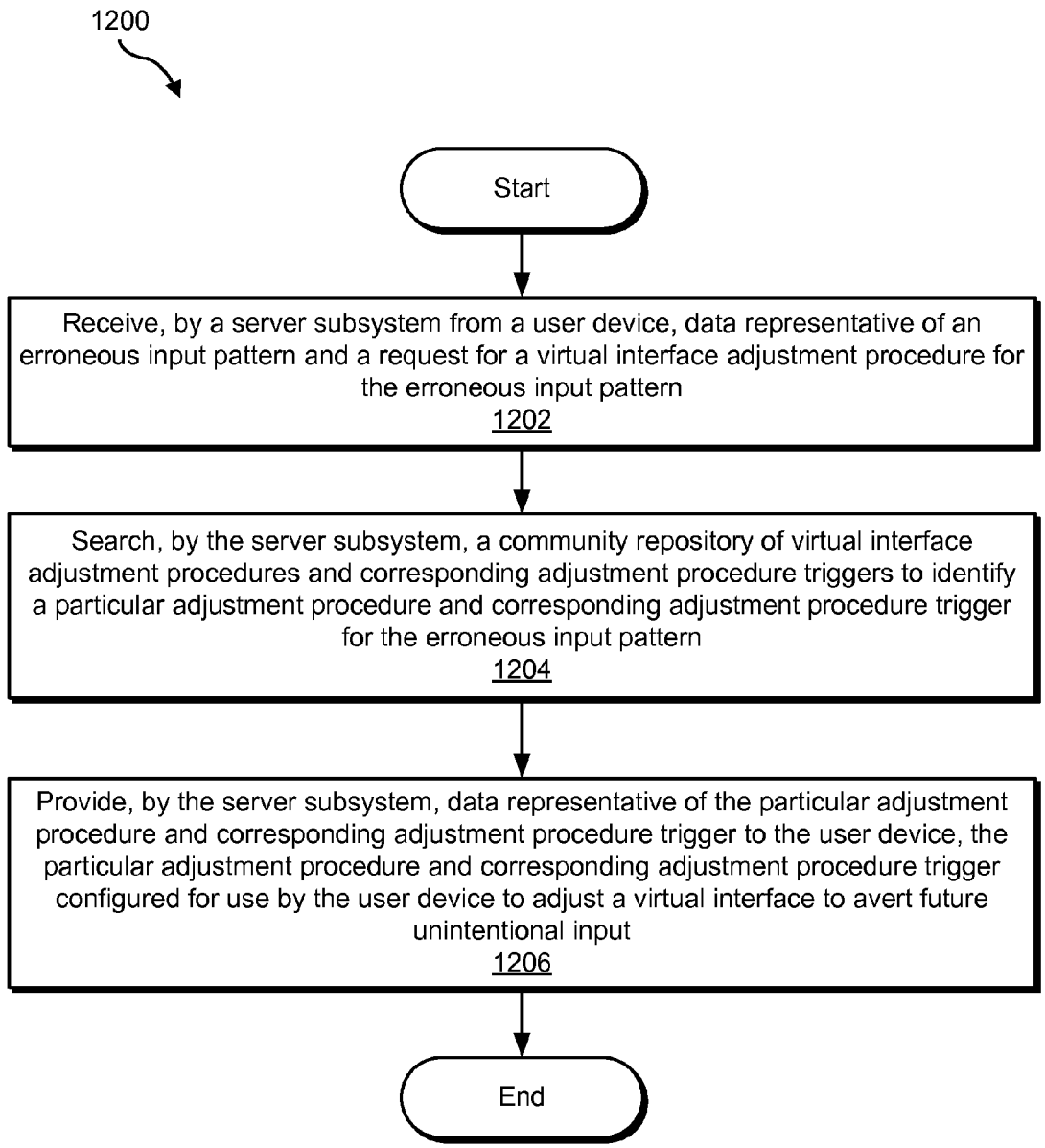

FIGS. 11-12 illustrate exemplary virtual interface adjustment methods (i.e., methods 1100 and 1200). While FIGS. 11-12 illustrate exemplary steps according to certain embodiments, other embodiments may omit, add to, reorder, combine, and/or modify any of the steps shown in FIGS. 11-12. One or more of the steps shown in certain methods illustrated in FIGS. 11-12 may be combined with and/or performed in conjunction with (e.g., performed before or after) one or more steps of one or more other methods illustrated in FIGS. 11-12. The methods illustrated in FIGS. 11-12 may be performed by any component or combination of components of system 100 and/or components of one or more implementations of system 100 (e.g., server subsystem 806, server subsystem 906, user device 802, and/or one or more user devices 902).

Turning to FIG. 11, in step 1102, a virtual interface adjustment system ("system") detects, based on user input data associated with user input received by way of a virtual interface of a user device, an erroneous input pattern, such as described herein.

In step 1104, the system determines, based on the erroneous input pattern, an adjustment procedure configured to adjust the virtual interface to avert future unintentional inputs that correspond to the at least one unintentional input of the erroneous input pattern, such as described herein.

In step 1106, the system determines an adjustment procedure trigger for the adjustment procedure, such as described herein.

In step 1108, the system activates the adjustment procedure trigger, such as described herein.

In step 1110, the system detects an occurrence of the adjustment procedure trigger (e.g., detects an occurrence of an input context specified by the adjustment procedure trigger), such as described herein.

In step 1112, the system executes, in response to the detecting of the occurrence of the adjustment procedure trigger, the adjustment procedure to avert the future unintentional inputs that correspond to the at least one unintentional input of the erroneous input pattern, such as described herein.

In step 1114, the system publishes the adjustment procedure trigger and the adjustment procedure to a community repository of adjustment procedure triggers and corresponding adjustment procedures, such as described herein.

Although not shown in FIG. 11, method 1100 may further include one or more steps in which the system detects an end of the occurrence of the adjustment procedure trigger (e.g., an end of an occurrence of an input context specified by the adjustment procedure trigger) and, in response, ends or reverses the execution of the adjustment procedure trigger, such as described herein.

Turning to FIG. 12, in step 1202, a server subsystem receives, from a user device, data representative of an erroneous input pattern and a request for a virtual interface adjustment procedure for the erroneous input pattern, such as described herein.

In step 1204, the server subsystem searches a community repository of virtual interface adjustment procedures and corresponding adjustment procedure triggers to identify a particular adjustment procedure and corresponding adjustment procedure trigger for the erroneous input pattern, such as described herein.

In step 1206, the server subsystem provides data representative of the particular adjustment procedure and corresponding adjustment procedure trigger to the user device, the particular adjustment procedure and corresponding adjustment procedure trigger configured for use by the user device to adjust a virtual interface to avert future unintentional input, such as described herein.

In certain embodiments, one or more of the components and/or processes described herein may be implemented and/or performed by one or more appropriately configured computing devices (e.g., a phone device and/or a server device). To this end, one or more of the systems and/or components described above may include or be implemented by any computer hardware and/or computer-implemented instructions (e.g., software) embodied on a non-transitory computer-readable medium and configured to direct one or more computing devices to perform one or more of the processes described herein. In particular, system components may be implemented on one physical computing device or may be implemented on more than one physical computing device. Accordingly, system components may include and/or be implemented by any number of computing devices, and may employ and/or interface with any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 13:
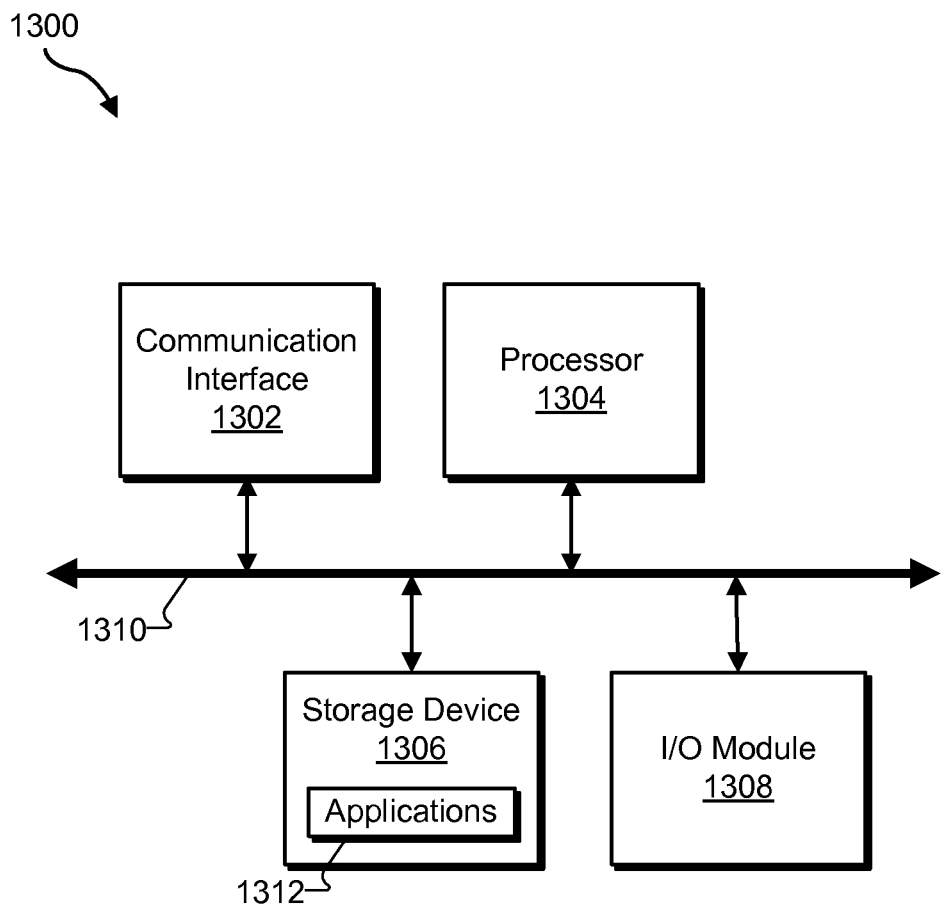
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a communications medium interface, a modem, and any other suitable interface. Communication interface 1302 may be configured to interface with any suitable communication media, protocols, and formats, including any of those mentioned above.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 (which may include, but are not limited to, one or more of the software applications described herein) configured to direct processor 1304 to perform any of the operations described herein may be stored within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with input pattern facility 102, adjustment configuration facility 104, and/or adjustment application facility 106. Likewise, storage facility 108 may be implemented by or within storage device 1306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a virtual interface adjustment system based on user input data associated with user input received by way of a virtual interface of a user device, an erroneous input pattern that includes at least one unintentional input;
   determining, by the virtual interface adjustment system based on the erroneous input pattern, an adjustment procedure configured to adjust the virtual interface to avert future unintentional inputs that correspond to the at least one unintentional input of the erroneous input pattern;
   determining, by the virtual interface adjustment system, an adjustment procedure trigger for the adjustment procedure;
   activating, by the virtual interface adjustment system, the adjustment procedure trigger;
   detecting, by the virtual interface adjustment system after the activating of the adjustment procedure trigger, an occurrence of the adjustment procedure trigger; and
   executing, by the virtual interface adjustment system in response to the detecting of the occurrence of the adjustment procedure trigger, the adjustment procedure to avert the future unintentional inputs that correspond to the at least one unintentional input of the erroneous input pattern.

2. The method of claim 1, wherein the executing of the adjustment procedure comprises shifting a location of an effective input area of a virtual input object of the virtual interface.

3. The method of claim 1, wherein the executing of the adjustment procedure comprises shifting a location of a touch input received by way of the virtual interface.

4. The method of claim 1, wherein the erroneous input pattern includes one or more attributes of the user device at a time the user input is received by way of the virtual interface, the at least one unintentional input, and at least one correction of the at least one unintentional input.

5. The method of claim 4, wherein the at least one correction of the at least one unintentional input comprises at least one of a manual correction provided by the user of the user device and an automatic correction performed by the user device.

6. The method of claim 1, wherein:
   the erroneous input pattern includes an orientation of the user device at a time the user input is received by way of the virtual interface;
   the adjustment procedure trigger is configured to trigger the execution of the adjustment procedure in response to the user device having a current orientation that matches the orientation of the user device at the time the user input is received by way of the virtual interface.

7. The method of claim 6, wherein the detecting of the occurrence of the adjustment procedure trigger comprises detecting that the current orientation of the user device matches the orientation of the user device at the time the user input is received by way of the virtual interface.

8. The method of claim 1, wherein the activating of the adjustment procedure trigger comprises adding the adjustment procedure trigger and the adjustment procedure to a virtual interface adjustment profile associated with the user device.

9. The method of claim 1, further comprising publishing the adjustment procedure trigger and the adjustment procedure to a community repository of adjustment procedure triggers and corresponding adjustment procedures.

10. The method of claim 1, wherein the determining of the adjustment procedure and the determining of the adjustment procedure trigger comprise:
sending data representative of at least a portion of the erroneous input pattern from the user device to a server subsystem for use by the server subsystem to search a community repository of adjustment procedure triggers and adjustment procedures; and
receiving data representative of the adjustment procedure and the adjustment procedure trigger from the server subsystem.

11. The method of claim 1, wherein the determining of the adjustment procedure and the determining of the adjustment procedure trigger comprise:
searching, based on at least part of the erroneous input pattern, a community repository of adjustment procedure triggers and adjustment procedures;
finding, based on the searching, the adjustment procedure and the adjustment procedure trigger within the community repository; and
determining that the adjustment procedure and the adjustment procedure trigger found within the community repository match the erroneous input pattern.

12. The method of claim 11, wherein the determining that the adjustment procedure and the adjustment procedure trigger found within the community repository match the erroneous input pattern further comprises comparing profile information associated with the user device with profile information associated with one or more other user devices.

13. The method of claim 1, wherein the determining of the adjustment procedure comprises:
analyzing the erroneous input pattern; and
defining the adjustment procedure based on the analyzing of the erroneous input pattern.

14. The method of claim 1, embodied as computer-executable instructions on at least one non-transitory computer-readable medium.

15. A method comprising:
receiving, by a server subsystem from a user device, data representative of an erroneous input pattern and a request for a virtual interface adjustment procedure for the erroneous input pattern, the erroneous input pattern including at least one unintentional input;
searching, by the server subsystem, a community repository of virtual interface adjustment procedures and corresponding adjustment procedure triggers to identify a particular adjustment procedure and corresponding adjustment procedure trigger for the erroneous input pattern; and
providing, by the server subsystem, data representative of the particular adjustment procedure and corresponding adjustment procedure trigger to the user device, the particular adjustment procedure and corresponding adjustment procedure trigger configured for use by the user device to adjust a virtual interface to avert future unintentional input corresponding to the at least one unintentional input.

16. The method of claim 15, wherein the searching comprises comparing the erroneous input pattern to one or more of the adjustment procedure triggers in the community repository.

17. The method of claim 15, wherein the searching comprises comparing a profile associated with the user device to one or more other profiles associated with one or more other user devices.

18. The method of claim 15, wherein the providing of the data representative of the particular adjustment procedure and corresponding adjustment procedure trigger to the user device comprises providing a virtual interface adjustment profile for another user device to the user device.

19. The method of claim 15, embodied as computer-executable instructions on at least one non-transitory computer-readable medium.

20. A system comprising:
an input pattern facility configured to detect, based on user input data associated with user input received by way of a virtual interface of a user device, an erroneous input pattern that includes at least one unintentional input;
an adjustment configuration facility communicatively coupled to the input pattern facility and configured to
determine, based on the erroneous input pattern, an adjustment procedure configured to adjust the virtual interface to avert future unintentional inputs that correspond to the at least one unintentional input of the erroneous input pattern,
determine an adjustment procedure trigger for the adjustment procedure, and
activate the adjustment procedure trigger; and
an adjustment application facility communicatively coupled to the adjustment configuration facility and configured to
detect, after the activating of the adjustment procedure trigger, an occurrence of the adjustment procedure trigger, and
execute, in response to the detecting of the occurrence of the adjustment procedure trigger, the adjustment procedure to avert the future unintentional inputs that correspond to the at least one unintentional input of the erroneous input pattern.

* * * * *